US012062276B2

(12) United States Patent
Guzik et al.

(10) Patent No.: US 12,062,276 B2
(45) Date of Patent: Aug. 13, 2024

(54) EMERGENCY SITUATION DETECTION AND RESPONSE BASED ON PROTECTIVE EQUIPMENT SENSOR DATA

(71) Applicants: Getac Corporation, New Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 130 days.

(21) Appl. No.: 17/494,692

(22) Filed: Oct. 5, 2021

(65) Prior Publication Data

US 2023/0108026 A1  Apr. 6, 2023

(51) Int. Cl.
| | |
|---|---|
| G08B 25/10 | (2006.01) |
| B64C 39/02 | (2023.01) |
| G06N 20/00 | (2019.01) |
| G08B 25/01 | (2006.01) |
| G08B 25/14 | (2006.01) |

(Continued)

(52) U.S. Cl.
CPC .......... G08B 25/016 (2013.01); B64C 39/024 (2013.01); G06N 20/00 (2019.01); G08B 25/10 (2013.01); G08B 25/14 (2013.01); H04N 23/66 (2023.01); H04W 4/021 (2013.01); H04W 4/023 (2013.01); H04W 4/38 (2018.02);

(Continued)

(58) Field of Classification Search
CPC .................................................... G08B 25/016
USPC ......................................................... 455/404.2
See application file for complete search history.

(56) References Cited

U.S. PATENT DOCUMENTS

| | | | |
|---|---|---|---|
| 2015/0269824 A1* | 9/2015 | Zhang | A61B 5/746 |
| | | | 340/539.12 |
| 2018/0050800 A1 | 2/2018 | Boykin et al. | |

(Continued)

FOREIGN PATENT DOCUMENTS

| | | |
|---|---|---|
| KR | 20170065137 A | 6/2017 |
| KR | 102047341 B1 | 11/2019 |

OTHER PUBLICATIONS

International Patent Application No. PCT/US2022/045678, International Search Report and Written Opinion mailed Jan. 30, 2023, 13 pages.

*Primary Examiner* — Qutbuddin Ghulamali
(74) *Attorney, Agent, or Firm* — Finnegan, Henderson, Farabow, Garrett & Dunner, L.L.P.

(57) ABSTRACT

Sensor data from one or more protective equipment sensors of protective equipment worn by a person are received. In response to determining based at least on the sensor data that no emergency situation occurred for the person, sensor data is sent from the body-worn hub to a server when a route of communication is available. In response to determining based at least on the sensor data that an emergency situation occurred for the person and at least one route of communication is currently available, the sensor data is sent from the body-worn hub to the server via at least one route of communication. However, in response to determining based at least on the sensor data that an emergency situation occurred for the person and there is no available route of communication, the sensor data is analyzed at the body-worn hub to determine whether the person is injured.

18 Claims, 8 Drawing Sheets

(51) Int. Cl.
  *H04N 23/66* (2023.01)
  *H04W 4/02* (2018.01)
  *H04W 4/021* (2018.01)
  *H04W 4/38* (2018.01)
  *H04W 4/90* (2018.01)
  *H04W 76/50* (2018.01)
  *B64U 101/00* (2023.01)
  *B64U 101/20* (2023.01)

(52) U.S. Cl.
  CPC ............. *H04W 4/90* (2018.02); *H04W 76/50* (2018.02); *B64U 2101/00* (2023.01); *B64U 2101/20* (2023.01)

(56) References Cited

U.S. PATENT DOCUMENTS

| | | |
|---|---|---|
| 2019/0082137 A1 | 3/2019 | Waniguchi et al. |
| 2019/0174208 A1* | 6/2019 | Speicher .................. G06F 1/163 |
| 2020/0177849 A1* | 6/2020 | Shimada ................ G06F 3/0482 |
| 2020/0258374 A1* | 8/2020 | Mehta ................... G08B 26/007 |

* cited by examiner

EMERGENCY SITUATION DETECTION AND RESPONSE BASED ON PROTECTIVE EQUIPMENT SENSOR DATA

BACKGROUND

Law enforcement officers generally carry multiple body-worn electronic devices as they perform their law enforcement functions. For example, law enforcement agencies are increasingly mandating that their law enforcement officers carry and use portable recording devices to record their interactions with the public. The recordings may serve to protect the public from improper policing, as well as protect law enforcement officers from false allegations of police misconduct. Other examples of electronic devices that are carried by a law enforcement officer may include a radio, a smartphone, a biometric monitor, a non-lethal electronic shock weapon, and electronic add-on sensors for the officer's primary weapon, i.e., a gun. The add-on sensors may include a sensor that detects the unholstering of an officer's gun from its holster or a sensor that detects the firing of the officer's gun. The law enforcement officers may also wear protective equipment while on duty, such protective equipment may include protective vests, helmets, or other items that protect the law enforcement officers from injury or death caused by various weapons.

SUMMARY

Described herein are techniques for using protective equipment sensor data collected by the protective equipment worn by a law enforcement officer to detect that the law enforcement officer is experiencing an emergency situation, as well as initiating one or more actions to assist the law enforcement officer.

In some embodiments, the protective equipment worn by a law enforcement officer may be a protective vest that has built-in sensors to detect forceful impacts to a law enforcement officer's body and/or built-in sensors to detect the wellbeing of the law enforcement officer. In other embodiments, a body-worn hub that receives protective equipment sensor data from the protective equipment worn by a law enforcement officer may determine that an emergency situation has occurred with respect to the officer based on the protective equipment sensor data. For example, the body-worn hub may determine that an emergency situation occurred when a protective vest of the law enforcement officer is penetrated. In another example, the body-worn hub may determine that the emergency situation occurred when the protective vest of the law enforcement officer is penetrated and the and law enforcement officer is in a prone position.

In some instances, when the body-worn hub has determined that the emergency situation occurred, the body-worn hub may activate multiple routes of wireless communication to send the sensor data collected by the protective equipment and/or one or more other body-worn devices to a network operation center (NOC) server 116 instead of using a single route of wireless communication. For example, the body-worn hub may send the sensor data via a low-power transceiver (e.g., a Wi-Fi transceiver) to a ground vehicle hub for transmission by the ground vehicle hub via a high-power transceiver (e.g., a cellular transceiver) to the NOC server, as well as use a high-power transceiver of the body-worn hub to directly transmit the sensor data to the NOC server. However, if no route of wireless communication with the NOC server is available, the body-worn hub may initiate one or more actions to assist the law enforcement officer.

In additional embodiments, the NOC server may analyze the received sensor data associated with a law enforcement officer to determine whether the law enforcement officer is in an emergency situation. The sensor data may include protective equipment sensor data collected by the sensors on the protective equipment and/or other sensor data collected by one or more other body-worn devices of the law enforcement officer. In instances in which the NOC server determines that the officer is in an emergency situation based on the received sensor data, the NOC server may analyze the received sensor data and/or additional data to determine whether the law enforcement officer is injured so as to initiate one or more suitable actions to assist the law enforcement officer.

In other embodiments, a ground vehicle hub may receive sensor data associated with a law enforcement officer from a body-worn hub worn by the officer. The ground vehicle hub may be a hub that is installed in a ground vehicle that is assigned for use by the law enforcement officer. The sensor data may include protective equipment sensor data collected by sensors on the protective equipment and/or other sensor data collected by one or more other body-worn devices of the law enforcement officer. The sensor data may be further transmitted by the ground vehicle hub to the NOC server. Additionally, or concurrently, the ground vehicle hub may further analyze the received sensor data. Accordingly, if the ground vehicle hub determines that the officer is in an emergency situation based on the received sensor data, the ground vehicle hub may deploy an unmanned aerial vehicle (UAV) from the ground vehicle to assist the law enforcement officer. In some instances, the ground vehicle hub may also initiate one or more additional tasks to assist the law enforcement officer.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
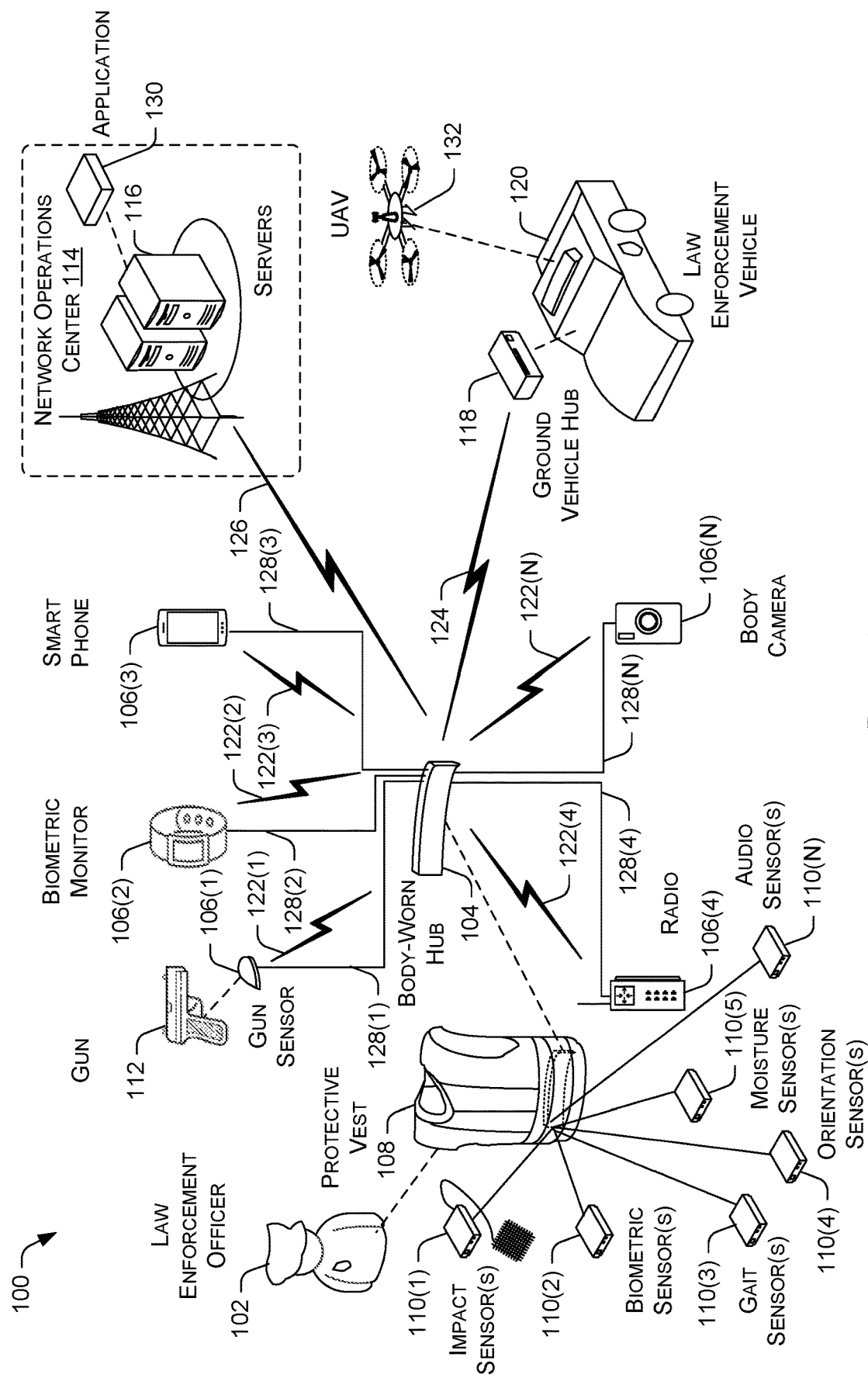
FIG. 1 illustrates an example environment for implementing emergency situation detection and response based on protective equipment sensor data.

Described herein are techniques for using protective equipment sensor data collected by the protective equipment worn by a law enforcement officer to detect that the law enforcement officer is experiencing an emergency situation, as well as initiating one or more actions to assist the law enforcement officer.

In some embodiments, the protective equipment worn by a law enforcement officer may be a protective vest that has built-in sensors to detect forceful impacts to a law enforcement officer's body and/or built-in sensors to detect the wellbeing of the law enforcement officer. In such embodiments, the built-in sensors may include at least one of one or more wire mesh-based or gel-based impact sensors, one or more biometric sensors, one or more gait sensors, one or more orientation sensors, one or more moisture sensors, one or more audio sensors, and/or so forth. For example, the impact sensors may detect blunt force impacts or penetrative impacts to the body of the law enforcement officer. The biometric sensors may detect biometric readings such as blood pressure, heart rate, etc. of the law enforcement officer. The one or more gait sensors may detect whether the law enforcement officer is motionless, walking, running, etc. The one or more orientation sensors may detect whether the officer's torso is upright, prone, or in some other position. The one or more moisture sensors may detect the presence of excess sweat or blood loss. The one or more audio sensors may detect abnormal noises, such as noise from blunt force impacts on the body of the law enforcement officer, gunshots, vehicle impact noises, and/or so forth.

In other embodiments, a body-worn hub that receives protective equipment sensor data from the protective equipment worn by a law enforcement officer may determine that an emergency situation has occurred with respect to the officer based on the protective equipment sensor data. For example, the body-worn hub may determine that an emergency situation occurred when a protective vest of the law enforcement officer is penetrated. In another example, the body-worn hub may determine that the emergency situation occurred when the protective vest of the law enforcement officer is penetrated and the and law enforcement officer is in a prone position.

In some instances, when the body-worn hub has determined that the emergency situation occurred, the body-worn hub may activate multiple routes of wireless communication to send the sensor data collected by the protective equipment and/or one or more other body-worn devices to a network operation center (NOC) server instead of using a single route of wireless communication. For example, the body-worn hub may send the sensor data via a low-power transceiver (e.g., a Wi-Fi transceiver) to a ground vehicle hub for transmission by the ground vehicle hub via a high-power transceiver (e.g., a cellular transceiver) to the NOC server, as well as use a high-power transceiver of the body-worn hub 104 to directly transmit the sensor data to the NOC server. However, if no route of wireless communication with the NOC server is available, the body-worn hub may initiate one or more actions to assist the law enforcement officer.

In additional embodiments, the NOC server may analyze the received sensor data associated with a law enforcement officer to determine whether the law enforcement officer is in an emergency situation. The sensor data may include protective equipment sensor data collected by sensors on the protective equipment and/or other sensor data collected by one or more other body-worn devices of the law enforcement officer. In instances in which the NOC server determines that the officer is in an emergency situation based on the received sensor data, the NOC server may analyze the received sensor data and/or additional data to determine whether the law enforcement officer is injured so as to initiate one or more suitable actions to assist the law enforcement officer.

In other embodiments, a ground vehicle hub may receive sensor data associated with a law enforcement officer from a body-worn hub worn by the officer. The ground vehicle hub may be a hub that is installed in a ground vehicle that is assigned for use by the law enforcement officer. The sensor data may include protective equipment sensor data collected by sensors on the protective equipment and/or other sensor data collected by one or more other body-worn devices of the law enforcement officer. The sensor data may be further transmitted by the ground vehicle hub to the NOC server. Additionally, or concurrently, the ground vehicle hub may further analyze the received sensor data. Accordingly, if the ground vehicle hub determines that the officer is in an emergency situation based on the received sensor data, the ground vehicle hub may deploy a UAV from the ground vehicle to assist the law enforcement officer. In some instances, the ground vehicle hub may also initiate one or more additional tasks to assist the law enforcement officer.

The use of protective equipment sensor data for emergency situation detection and response may ensure that assistance is provided to a law enforcement officer even when the law enforcement officer is incapacitated or otherwise unable to request additional assistance in an emergency situation. Furthermore, the ability of a body-worn hub, a ground vehicle hub, and a NOC server to independently and/or cooperatively detect and respond to emergency situations may provide additional redundancy for emergency assistance even when disruptions in routes of wireless communication hinder the transmission of protective equipment sensor data to the NOC server. Example implementations are provided below with reference to FIGS. 1-8.

Example Environment

FIG. 1 illustrates an example environment for implementing emergency situation detection and response based on protective equipment sensor data. The environment 100 may include a law enforcement officer 102 that is equipped with a body-worn hub 104 and multiple body-worn devices 106(1)-106(N). In some embodiments, the body-worn hub 104 may be a standalone device that is worn by the law enforcement officer 102. In other embodiments, the body-worn hub 104 may be integrated into a garment or a piece of equipment that is worn by the law enforcement officer 102. For example, the body-worn hub 104 may be integrated into a protective vest 108 that is worn by the law enforcement officer 102. In various embodiments, the protective vest 108 may be equipped with one or more built-in sensors. For example, the built-sensors may include at least one of one or more wire mesh-based and/or gel-based impact sensors 110(1), one or more biometric sensors 110(2), one or more gait sensors 110(3), one or more orientation sensors 110(4), one or more moisture sensors 110(5), one or more audio sensors 110(N), and/or so forth. For example, the impact sensors 110(1) may detect blunt force impacts or penetrative impacts to the body of the law enforcement officer 102. In the case of a wire mesh-based impact sensor, an impact may break one or more electrically conductive wires, resulting in an interruption of one or more electrical connectivity that is detected by an electronic processing circuit of the sensor. In the case of a gel-based impact sensor, an impact may deform or penetrate one or more gel packs. The deformation or penetration of one or more gel packs may be detected by pressure sensors that are built into each gel pack and reported electrically to an electronic processing circuit of the sensor.

Accordingly, the impact sensors 110(1) may provide sensor data such as the location of the impact, the size of the impact area, the impact pressure, and/or whether the impact penetrated the protective vest 108. For example, in the case of a wire mesh-based impact sensor, the electronic processing circuit of the sensor may be configured to recognize different wires of the wire-mesh as corresponding to different areas of the impact, equating a higher number of wire breaks as higher impact force level and/or bigger impact size, and/or so forth. In the example of a gel-based impact sensor, the electronic processing circuit of the sensor may be configured to recognize different gel packs as corresponding to different areas of impact, equating a higher number of gel packs affected by an impact as a higher impact force level and/or bigger impact area, and/or so forth.

Each of the one or more biometric sensors 110(2) may detect biometric readings such as blood pressure, heart rate, etc. of the law enforcement officer. Each of the one or more gait sensors 110(3) may detect whether the law enforcement officer is motionless, walking, running, etc. Each of the orientation sensors 110(4) may detect whether the officer's torso is upright, prone, or in some other position. Each of the moisture sensors 110(5) may detect the presence of excess sweat or blood loss. Each of the one or more audio sensors 110(N) may detect abnormal noises, such as noise from blunt force impacts on the body of the law enforcement officer, gunshots, vehicle impact noises, and/or so forth.

These sensors may be built into protective vest 108, an outer liner for the protective vest 108, and/or an inner insert for the protective vest 108. One or more of these built-in sensors of the protective vest 108 may be electrically coupled to the body-worn hub 104 such that the body-worn hub 104 may power such sensors. For example, such built-in sensors may be connected to the body-worn hub 104 via electrically conductive connectors. Furthermore, all of the built-in sensors of the protective vest 108 are communicatively connected to the body-worn hub 104 via wireless communication mechanisms (e.g., Bluetooth) or wire communication mechanisms (e.g., serial and/or parallel wired communication). Accordingly, the body-worn hub 104 may receive protective equipment sensor data that are collected by the built-in sensors of the protective vest 108. While the protective vest 108 is illustrated in FIG. 1 an embodiment of protective equipment that is capable of collect protective equipment sensor data for transmission to the body-worn hub 104, there may be other embodiments of protective equipment (e.g., a helmet) with built-in sensors that function in a similar manner.

The body-worn device 106(1)-106(N) may include various devices that are carried by the law enforcement officer 102. For example, the body-worn device 106(1) may be a gun sensor that is attached to a gun 112 or a holster for the gun 112, such that the gun sensor may detect whether the gun 112 is holstered unholstered, cocked, decocked, fired, misfired, dropped, and/or so forth. The body-worn device 106(2) may be a biometric monitor (e.g., a smartwatch) that monitors the vital signs of the law enforcement officer 102, such as body temperature, blood pressure, heart rate, etc. The body-worn device 106(3) may be a smartphone that is carried by the law enforcement officer 102. The body-worn device 106(4) may be a radio that the law enforcement officer 102 uses to communicate with a network operations center (NOC) 114. The body-worn device 106(N) may be a body camera that is capable of capturing audiovisual recording, e.g., video, of scenes and events encountered by the law enforcement officer 102.

The NOC 114 may include one or more NOC servers 116 that implement a computer-assisted dispatch platform, a data processing platform, and a data file storage platform. For example, the NOC 114 may be a part of a police station or an emergency assistance dispatch center. The NOC servers 116 may be physical servers located at the NOC 114 or virtual servers that are implemented in a cloud.

Each of the body-worn devices 106(1)-106(N) may have short-range wireless communication capabilities, such as Bluetooth, UWB, Wi-Fi, etc., and/or long-range wireless communication capabilities, such as cellular, satellite, etc. The cellular and satellite communication capabilities may be provided by respective cellular or satellite service providers. In some instances, a body-worn device may be capable of using the short-range wireless communication capabilities to communicate with another body-worn device or a hub, such as the body-worn hub 104. In other instances, a body-worn device may be capable of using the long-range wireless communication capabilities to communicate with the hub or the NOC servers 116 of the NOC 114. Additionally, each of the body-worn devices 106(1)-106(N) may be equipped with an electrically conductive coupling port that enables the device to send power to and receive power from another device, as well as exchange communication with another device. For example, the electrically conductive coupling port may be a mating receptacle that is configured to accept a mating plug of an electrically conductive wired connector, in which the wired connector includes a set of one or more electrically conductive wires or cables sufficient to complete an electrical circuit between two devices. However, in other implementations, the mating receptacle and plug may be substituted with other detachable connection mechanisms, such as a magnetic electrical connection mechanism. In some embodiments, the body-worn device may use the electrically conductive coupling port to send and receive communication that is encoded using digital and/or analog signals.

The body-worn hub 104 may have similar short-range and long-range wireless communication capabilities. In some instances, the body-worn hub 104 may be capable of using the short-range wireless communication capabilities to communicate with another body-worn device or a remote hub, such as the ground vehicle hub 118 in the law enforcement vehicle 120. For instance, the body-worn hub 104 may establish short-range wireless communication links 122(1)-122(N) with the body-worn devices 106(1)-106(N), respectively. In this way, the body-worn hub 104 and the body-worn devices 106(1)-106(N) may form a wireless mesh network of user devices. The body-worn devices 106(1)-106(N) and the body-worn hub 104 may use the short-range wireless communications links 122(1)-122(N) to exchange communication. For example, the body-worn devices 106(1)-106(N) may use the short-range wireless communications links 122(1)-122(N) to send sensor data of events detected or recorded by the sensors of the body-worn devices 106(1)-106(N) to the body-worn hub 104. Conversely, the body-worn hub 104 may use the short-range wireless communications links 122(1)-122(N) to send commands to the body-worn devices 106(1)-106(N) that trigger one or more of the body-worn devices 106(1)-106(N) to perform one or more actions in response to events that are detected.

As examples, the events that are detected or recorded by the sensors may include the gun sensor 106(1) detecting that a gun 112 of the law enforcement officer 102 is unholstered or holstered, an accelerometer in the smartphone 106(3) detecting that the officer is running, walking, or remaining still for a predetermined period of time, the biometric monitor 106(2) detecting that the heart rate of law enforcement officer 102 exceeding or falling below a predetermined rate threshold, an impact sensor in the protective vest 108 detecting an impact, and/or so forth. Thus, the events that are detected may include discrete events, such as a gun being unholstered or holstered, or a series of continuous events, such as a series of heart rate readings or body temperature readings. Further, the sensor data for an event may include one or more predetermined encoded values that correspond to the occurrence of the event. The sensor data for an event may also include sensor data that are captured by a sensor of a body-worn device for the event. For example, the sensor data may include audio data, video data, multimedia data, and/or so forth.

In another instance, the body-worn hub 104 may establish a short-range wireless communication link 124 with the ground vehicle hub 118, so that communications may be exchanged between the body-worn hub 104 and the ground vehicle hub 118. For example, the body-worn hub 104 may use the short-range wireless communication link 124 to send sensor data of events detected or recorded by the sensors of the body-worn devices 106(1)-106(N) to the ground vehicle hub 118, such as for data processing and/or backup purposes. Conversely, the ground vehicle hub 118 may use the short-range wireless communication link 124 to send commands to the body-worn hub 104. The commands may trigger one or more of the body-worn devices 106(1)-106(N) that are connected to the body-worn hub 104 to perform one or more actions in response to events that are detected. In other instances, the body-worn hub 104 may be capable of using the long-range wireless communication capabilities to communicate with a remote hub, such as the ground vehicle hub 118, or the NOC servers 116 of the NOC 114. For instance, the body-worn hub 104 may establish a long-range wireless communication link 126 with the NOC servers 116 of the NOC 114. In such an instance, the long-range wireless communication link 126 may be used by the body-worn hub 104 to send sensor data of events detected or recorded by the sensors of the body-worn devices 106(1)-106(N) to the NOC servers 116 of the NOC 114. Conversely, the NOC servers 116 may use the long-range wireless communication link 126 to send commands to the body-worn hub 104. The commands may trigger one or more of the body-worn devices 106(1)-106(N) that are connected to the body-worn hub 104 to perform one or more actions in response to events that are detected.

Additionally, the body-worn hub 104 may be equipped with a set of electrically conductive coupling ports that are similar to those featured on the body-worn devices 106(1)-106(N), in which a coupling port is a receptacle that may accept the mating plug of an electrically conductive wired connector that connects the body-worn hub to a body-worn device. However, in other implementations, the set of mating receptacles and plugs may be substituted with other detachable connection mechanisms, such as a magnetic connection mechanism. In this way, the body-worn hub 104 may send power to and receive power from the body-worn devices 106(1)-106(N), as well as exchange communication with the body-worn devices 106(1)-106(N) via wired connections. For example, the body-worn hub 104 may be connected to the body-worn devices 106(1)-106(N) via respective electrically conductive wired connectors 128(1)-128(N). In other words, the electrically conductive wired connectors 128(1)-128(N) may enable the body-worn hub 104 and the body-worn devices 106(1)-106(N) to form a wired mesh network.

In further embodiments, the body-worn hub 104 may be configured such that the hub will automatically stop using wireless communication with a body-worn device and default to using wired communication when an electrically conductive wired connection is made between the body-worn hub and the body-worn device. The wired communication may enable at least the same data to be exchanged between the body-worn hub 104 and the body-worn device as the wireless communication. For example, when a wired communication link is established between the body-worn hub 104 and the gun sensor 106(1) via the wired connector 128(1), the body-worn hub 104 may automatically terminate an existing wireless communication link 122(1) between the body-worn hub 104 and the gun sensor 106(1). However, when the electrically conductive wired connection between the body-worn hub and the body-worn device is disconnected, the body-worn hub 104 may automatically switch to using wireless communication with the body-worn device. For example, when the wired communication link between the body-worn hub 104 and the gun sensor 106(1) is terminated due to the disconnection of the wired connector 128(1), the body-worn hub 104 may reestablish the wireless communication link 122(1) with the gun sensor 106(1).

The body-worn hub 104 may process the sensor data that the hub receives from one or more devices. These devices may include the protective vest 108, the body-worn devices, such as one or more of the body-worn devices 106(1)-106(N), and/or so forth. The body-worn hub 104 may process such sensor data to determine whether to trigger the performance of actions by at least one body-worn device of the 106(1)-106(N). In some embodiments, the body-worn hub 104 may include a software event handler that processes sensor data to generate commands for the connected body-worn devices. For example, the body-worn hub 104 may trigger the body camera 106(N) of a law enforcement officer 102 to start a video recording when the body-worn hub 104 is notified by the gun sensor 106(1) that the officer's gun is unholstered.

In other embodiments, the body-worn hub 104 may determine that an emergency situation has occurred with respect to the officer based on the protective equipment sensor data collected by the protective vest 108. For example, the body-worn hub 104 may determine that an emergency situation occurred when the protective vest 108 of the law enforcement officer is penetrated. In another example, the body-worn hub 104 may determine that the emergency situation occurred when the protective vest 108 of the law enforcement officer is penetrated and the and law enforcement officer is in a prone position.

In some instances, when the body-worn hub 104 has determined that the emergency situation occurred, the body-worn hub may activate multiple routes of wireless communication to send the sensor data collected by the protective equipment and/or one or more other body-worn devices to a network operation center (NOC) server instead of using a single route of wireless communication. For example, if no emergency situation is occurring for the law enforcement officer 102, the body-worn hub 104 may send the sensor data via a low-power transceiver (e.g., a Wi-Fi transceiver) to a ground vehicle hub, such as the ground vehicle hub 118, for transmission by the ground vehicle hub via a high-power transceiver (e.g., a cellular transceiver) to the NOC servers 116. On the other hand, if the body-worn hub 104 determines that an emergency situation has occurred for the law enforcement officer 102, the body-worn hub 104 may send the sensor data via a low-power transceiver (e.g., a Wi-Fi transceiver) to a ground vehicle hub for transmission by the ground vehicle hub via a high-power transceiver (e.g., a cellular transceiver) to the NOC server, as well as use a high-power transceiver of the body-worn hub 104 to directly transmit the sensor data to the NOC server. However, if no route of wireless communication with the NOC servers 116 is available (e.g., the body-worn hub 104 is unable to communicatively connect to a ground vehicle hub or directly to the NOC servers 116), the body-worn hub 104 may directly initiate one or more actions to assist the law enforcement officer. Alternatively, or in addition, the body-worn hub 104 may activate multiple forms of low-power transceivers (e.g., Bluetooth, Wi-Fi, UWB) to attempt to connect to any available Internet connection access point to the sensor data to the NOC servers 116.

In additional embodiments, a NOC application 130 on the NOC servers 116 may analyze the received sensor data associated with a law enforcement officer (e.g., the law enforcement officer 102) to determine whether the law enforcement officer is in an emergency situation. The sensor data may include protective equipment sensor data collected by sensors of the protective equipment and/or other sensor data collected by one or more other body-worn devices of the law enforcement officer. In instances in which the NOC server determines that the officer is in an emergency situation based on the received sensor data, the NOC application 130 may analyze the received sensor data and/or additional data to determine whether the law enforcement officer is injured so as to initiate one or more suitable actions to assist the law enforcement officer. For example, the additional data may include reports of incidents in an area that includes a present geolocation of the law enforcement officer, such as an armed suspect on the loose, a riot in progress, a traffic accident occurred, a wildfire is burning in the area, etc.

In other embodiments, a ground vehicle hub (e.g., the ground vehicle hub 118) may receive sensor data associated with a law enforcement officer from a body-worn hub (e.g., the body-worn hub 104) worn by the officer. The ground vehicle hub may be a hub that is installed in a ground vehicle, such as the law enforcement vehicle 120, that is assigned for use by the law enforcement officer. The sensor data may include protective equipment sensor data collected by the sensors of the protective equipment and/or other sensor data collected by one or more other body-worn devices of the law enforcement officer. In some instances, the sensor data may be further transmitted by the ground vehicle hub to the NOC server. Alternatively, or concurrently, the ground vehicle hub may further analyze the received sensor data. Accordingly, if the ground vehicle hub determines that the officer is in an emergency situation based on the received sensor data, the ground vehicle hub may deploy a UAV, such as the UAV 132, from the ground vehicle to assist the law enforcement officer. The UAV 132 may be stored onboard on the ground vehicle and remotely launchable from an external opening of the ground vehicle. In some instances, the ground vehicle hub may also initiate one or more additional tasks to assist the law enforcement officer.

Example Body-Worn Hub Components

Figure 2:
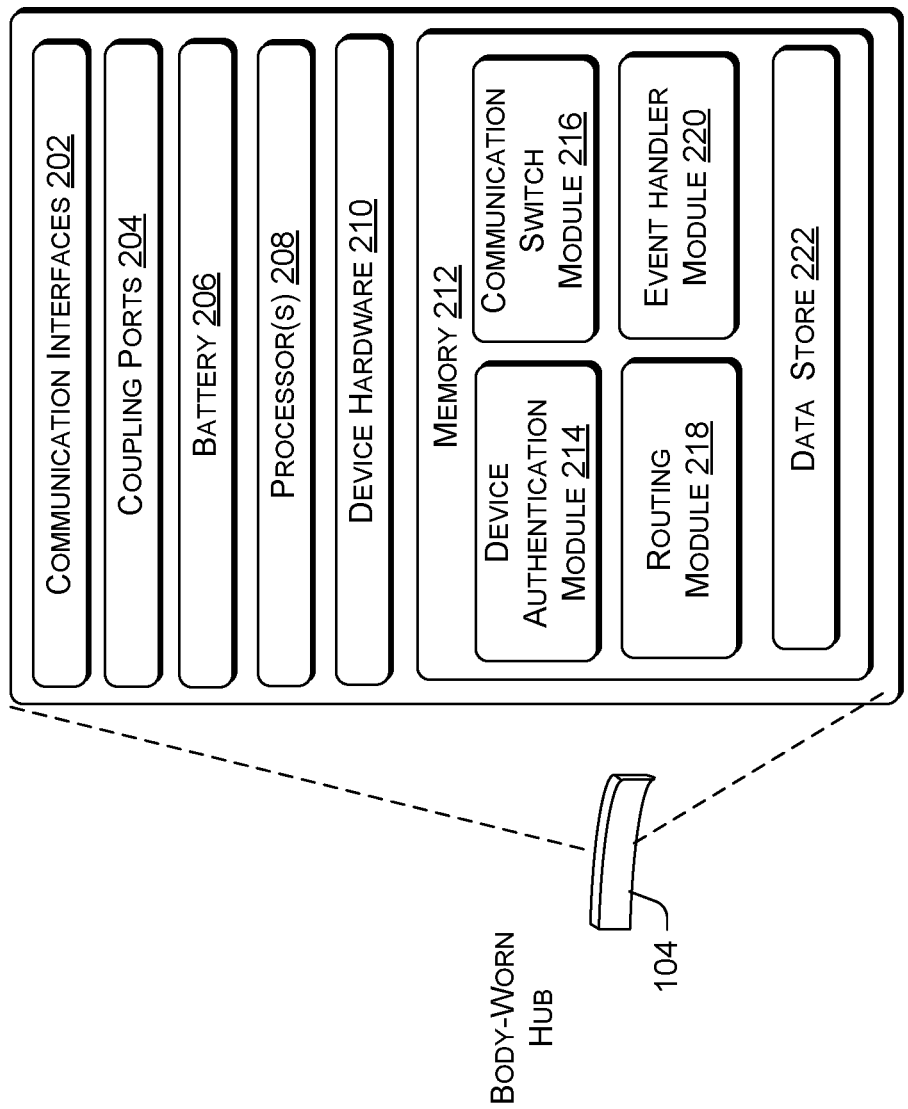
FIG. 2 is a block diagram showing various components of a body-worn hub that participates in emergency situation detection and response based on protective equipment sensor data.

FIG. 2 is a block diagram showing various components of a body-worn hub that participates in emergency situation detection and response based on protective equipment sensor data. The body-worn hub 104 may be equipped with communication interfaces 202, a set of electrically conductive coupling ports 204, a battery 206, one or more processors 208, device hardware 210, and/or memory 212. The communication interfaces 202 may include one or more short-range wireless communication transceivers (e.g., Bluetooth, UWB, Wi-Fi transceivers, and/or so forth), and/or one or more long-range wireless communication transceivers (e.g., cellular, satellite, and/or so forth). Each of the electrically conductive coupling ports 204 may be configured to accept an electrically conductive wired connector. The wired connector may be used by the body-worn hub 104 to receive power input from an external source, output power to an external load, as well as for performing wired communications. Generally speaking, the battery 206 of the body-worn hub 104 is configured to have a larger battery capacity than the batteries of the body-worn device.

The device hardware 210 may include signal converters, antennas, modems, hardware decoders and encoders, digital signal processors, a real-time clock (RTC) circuit, geolocation sensors, and/or so forth that enable the body-worn hub 104 to execute applications and exchange data with other devices, such as the body-worn devices 106(1)-106(N), via wired or wireless communication.

The memory 212 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 208 and the memory 212 of the body-worn hub 104 may implement a device authentication module 214, a communication switch module 216, a routing module 218, and an event handler module 220.

These modules may include routines, program instructions, objects, and/or data structures that perform particular tasks or implement particular abstract data types. The memory 212 may further store software (e.g., drivers, applications, firmware, etc.) that support various functionalities of the body-worn hub 104, such as software that are executed by the processors 208 to support the establishment of wired and wireless communication links. The memory 212 may also provide a data store 222. The data store 222 may store the sensor data collected by the body-worn devices 106(1)-106(N) and the protective equipment, such as the protective vest 108. In some embodiments, an operating system may also be implemented via the one or more processors 208 and the memory 212 to perform various functions, as well as to provide an execution environment that supports the executions of applications and modules.

The device authentication module 214 may authenticate various body-worn devices so that the hub may exchange wireless communication with the various body-worn devices. During a device authentication process, the device authentication module 214 may receive a device authentication credential (e.g., a device identifier, a secret code, a key, a digital certificate, and/or so forth) from a body-worn device. The device authentication module 214 may validate the device authentication credential against a list of authorized device authentication credentials stored in the memory 212 to determine if the body-worn device is authorized. Accordingly, the device authentication module 214 may determine that the device authentication credential of a body-worn device is valid when the device authentication credential matches an authorized device authentication credential stored in the data store 222. The list of device authentication credentials may be updated or modified by the NOC server 116 of the NOC 114. Alternatively, or concurrently, the device authentication module 214 may provide a hub authentication credential to a body-worn device for the body-worn device to perform mutual authentication. In some embodiments, the device authentication module 214 may also be configured to perform a secret key exchange with a hub or a server so that a corresponding secret key can be used to encrypt or decrypt the secured communication exchanged.

The communication switch module 216 may switch the body-worn hub 104 between using the short-range wireless transceiver and a corresponding electrically conductive coupling port to exchange communications with a body-worn device. In some embodiments, the communication switch module 216 may automatically terminate a short-range wireless communication link that is established with the body-worn device when a wired connection is established with the body-worn device via a particular coupling port of the set of electrically conductive coupling ports. For example, the communication switch module 216 may detect that the body-worn device is connected to a particular coupling port based on change in one or more electrical properties (e.g., voltage, resistance, and/or current) at the particular coupling port. As a result, the communication switch module 216 may send a termination command via the particular coupling port to command the body-worn device to power off its short-range transceiver.

In other embodiments, the communication switch module 216 may further use a wired communication protocol (e.g., Universal Serial Bus (USB) protocol, TCP/IP, or some other wired communication protocol) to establish a wired communication link with the body-worn hub 104 over the wired connection. In some instances, the communication switch module 216 may wait for the body-worn device to initiate the establishment of the wired communication link using the wired communication protocol. However, in other instances, the communication switch module 216 may initiate the establishment of the wired communication link with the body-worn device using the wired communication protocol. Once the wired communication link is established, the communication switch module 216 may send a termination command via the particular coupling port to command the body-worn device to power off its short-range transceiver. In some instances, when the communication switch module 216 has received short-range wireless communication termination confirmations from all body-worn devices connected to its coupling ports, the communication switch module 216 may power off its short-range transceiver as well to conserve battery power.

Conversely, when the communication switch module 216 detects that the wired connection between the body-worn hub 104 and at least one body-worn device is severed, the communication switch module 216 may power on the short-range wireless transceiver of the body-worn hub 104. For example, the one or more electrical properties at the electrically conductive coupling port may indicate to the communication switch module 216 that the wired connection is severed. In another example, the communication switch module 216 may determine that a wired connection to a body-worn device is severed when there is a lack of a periodic keep alive or heartbeat signal received from the body-worn device via the wired connection for a predetermined period of time. The powering on of the short-range wireless transceiver may enable the body-worn hub 104 to reestablish a short-range wireless communication link with the body-worn device with the severed wired connection.

The routing module 218 may handle the routing of sensor data that are received from the protective vest 108 and/or the body-worn devices to different recipient devices and services. In various embodiments, the routing module 218 may route sensor data from one or more body-worn devices to the event handler module 220, to another hub, and/or to the NOC servers 116 of the NOC 114. The routing module 218 may periodically route the geolocation of the body-worn hub 104 to a recipient device, such as a ground vehicle hub or the NOC servers 116.

The routing module 218 may handle the routing of sensor data of each event based on customizable configuration settings stored in a configuration file. In some embodiments, the routing module 218 may analyze a data set of the sensor data received from the sensors on the protective vest 108 and/or the body-worn devices of a law enforcement officer to determine whether an emergency situation occurred for the law enforcement officer. The data set may correspond to a recurring time interval, such as every two seconds, 5 seconds, ten seconds, etc. In at least one embodiment, the routing module 218 may determine that an emergency situation has occurred when certain sensor data from various combinations of one or more sensors are received. For example, the routing module 218 may determine that an emergency situation have occurred when the sensor data indicates: (1) penetration of the protective vest; (2) penetration of the protective vest in a specific area of the protective vest; (3) penetration of the protective vest and the officer is in a prone position; (4) a non-penetrating impact on the protective vest exceeding a certain impact force level threshold; (5) a non-penetrating impact on the protective vest exceeding a certain impact force level threshold in a specific area of the protective vest; (6) a non-penetrating impact on the protective vest and a first biometric reading (e.g., the blood pressure) or a second biometric reading (e.g., the heart rate) of the officer has deviated from a baseline level by a predetermined amount or percentage (e.g., 20% higher or lower); (7) each of the first biometric reading (e.g., the blood pressure) and/or the second biometric reading (e.g., the heart rate) of the officer deviating from a corresponding baseline level by more than a predetermined corresponding amount or percentage; or (8) a non-penetrating impact and gunshot sound detected.

Thus, if the routing module 218 determined that an emergency situation occurred for the law enforcement officer, the routing module 218 may activate multiple routes of wireless communication to send the sensor data collected by the protective equipment and/or one or more other body-worn devices to a network operation center (NOC) server 116 instead of using a single route of wireless communication. However, if no route of wireless communication with the NOC servers 116 is available, the routing module 218 may direct the event handler module 220 to initiate one or more actions to assist the law enforcement officer. For example, the routing module 218 may determine that no route of wireless communication with the NOC servers 116 is available when a ping or some other communication message to a network address of the NOC servers 116 resulted in no response from the NOC servers 116 within a predetermined time period. The sensor data is then buffered and transmitted by the routing module 218 to the NOC servers 116 when a route of wireless communication to the NOC servers 116 becomes available. Alternatively, or in addition, the routing module 218 may activate multiple forms of low-power transceivers (e.g., Bluetooth, Wi-Fi, UWB) to attempt to connect to any available Internet connection access point to the sensor data to the NOC servers 116.

The event handler module 220 may use an event handler to process the sensor data received from one or more body-worn devices to generate commands for at least one specific body-worn device to perform a particular action. In various embodiments, the sensor data may be notifications received from body-worn devices that are directly connected to the body-worn hub 104 and/or notifications received from body-worn devices connected to other hubs. For example, the event handler module 220 may generate a command for the body camera 106(1) to start recording when the event handler module 220 receives a notification that the gun 112 is unholstered. In another example, the event handler module 220 may generate a command for the body camera 106(1) to start recording when event handler module 220 receives a notification that the gun 112 is unholstered and the biometric monitor 106(2) detects that the heart rate of the law enforcement officer 102 is above a predetermined rate threshold.

In other embodiments, the event handler module 220 may generate at least one particular command in response to one or more specific events based on a customizable handler configuration file. The customizable handler configuration file may specify one or more actions to be taken and the body-worn devices that are to take the actions for different sets of one or more sensor data. In other embodiments, the event handler module 220 may use a machine-learning algorithm to determine one or more actions to be taken and the body-worn devices that are to take the action based on different sets of one or more sensor data. The event handler module 220 may receive updates or modifications to the handler configuration profile from the NOC servers 116 of the NOC 114 for storage in the data store 222.

In additional embodiments, the event handler module 220 may be directed by the routing module 218 to process the sensor data received from the sensors on the protective vest 108 and/or the body-worn devices of the law enforcement officer to determine whether the officer is injured. In such embodiments, the event handler module 220 may use a trained machine-learning (ML) model to process the received sensor data to predict that an officer may be injured, as well as to determine the root cause of the injury, such as a gunshot, knife attack, blunt force attack with a weapon, blunt force attack without a weapon, officer knocked down, officer fell from a height, officer suffered a medical emergency, and/or so forth. The ML model may provide a confidence rating as to the probability that the injury occurred. If the confidence rating exceeds a threshold, the event handler module 220 may initiate one or more actions that assist the law enforcement officer. For example, the actions may include triggering the body camera 106 of the law enforcement officer 102 to start a video recording, send automatic requests for emergency situation assistance to nearby body-worn hubs or ground vehicles of other law enforcement officers that are within communication range of the body-worn hub 104, in which the request includes details regarding the injury and the root cause of the injury. In instances in which the body-worn hub 104 is able to communicate with the ground vehicle hub associated with the officer, the event handler module 220 may request that the ground vehicle hub direct the corresponding ground vehicle to dispatch a UAV to a geolocation of the law enforcement officer.

Once the UAV arrives within a predetermined vicinity of the geolocation, the UAV may be configured to perform tasks such as record audiovisual footage of the scene around the geolocation, broadcast a warning noise or tone, illuminate the scene with onboard lighting, drop off a medical aid kit carried onboard to the law enforcement officer, activate a low-power and/or a high power transceiver to relay communication and sensor data between the body-worn hub 104 and a vehicle hub, another body-worn hub of another law enforcement officer, or the NOC servers 116, and/or so forth. However, in other embodiments, the event handler module 220 may initiate one or more actions (e.g., start video recording, send requests for emergency situation assistance, etc.) to assist the law enforcement officer without determining whether the law enforcement officer is injured. Following the initiation of one or more actions, the event handler module 220 may send an action event notification to a ground vehicle hub or the NOC servers 116 to indicate that one or more actions have been taken by the body-worn hub 104. The action event notification may include details on the actions taken, data identifiers of the sensor data on which the action is based on, and/or so forth. The data identifiers may include a unique data set identifier, a time and date range of the sensor data for which the actions are taken, a hash of the sensor data belong to the time and date range, and/or so forth.

Example Ground Vehicle Hub Components

Figure 3:
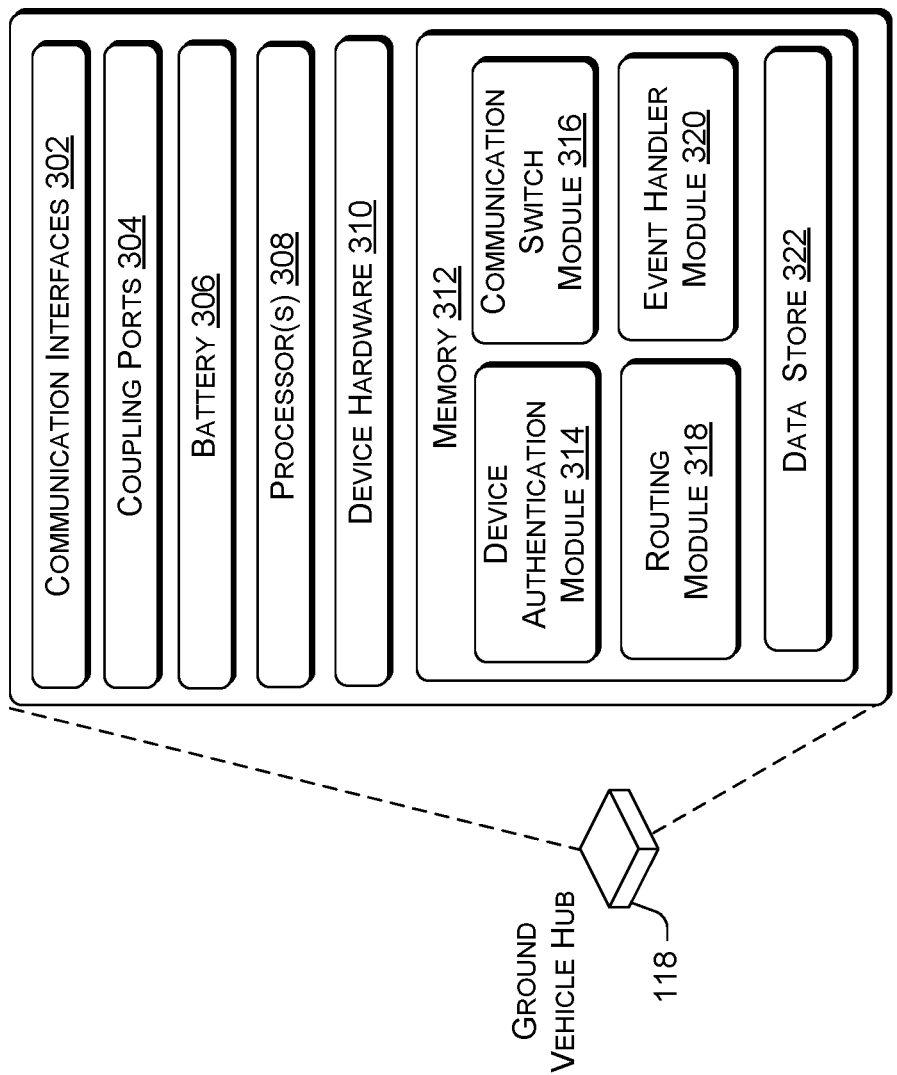
FIG. 3 is a block diagram showing various components of a ground vehicle hub that participates in emergency situation detection and response based on protective equipment sensor data.

FIG. 3 is a block diagram showing various components of a ground vehicle hub that participates in emergency situation detection and response based on protective equipment sensor data. The ground vehicle hub 118 may be equipped with communication interfaces 302, a set of electrically conductive coupling ports 304, a battery 306, one or more processors 308, device hardware 310, and/or memory 312. The communication interfaces 302 may include one or more short-range wireless communication transceivers (e.g., Bluetooth, UWB, Wi-Fi transceivers, and/or so forth), and/or one or more long-range wireless communication transceivers (e.g., cellular, satellite, and/or so forth). Each of the electrically conductive coupling ports 304 may be configured to accept an electrically conductive wired connector. The wired connector may be used by the ground vehicle hub 118 to receive power input from an external source, output power to an external load, as well as for performing wired communications. Generally speaking, the battery 306 of the ground vehicle hub 118 is configured to have a larger battery capacity than the batteries of the body-worn device.

The device hardware 310 may include signal converters, antennas, modems, hardware decoders and encoders, digital signal processors, an RTC circuit, and/or so forth that enable the ground vehicle hub 118 to execute applications and exchange data with other devices, such as the body-worn devices 106(1)-106(N), via wired or wireless communication.

The memory 312 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 308 and the memory 312 of the ground vehicle hub 118 may implement a device authentication module 314, a communication switch module 316, a routing module 318, and an event handler module 320. These modules may include routines, program instructions, objects, and/or data structures that perform particular tasks or implement particular abstract data types. The memory 312 may further store software (e.g., drivers, applications, firmware, etc.) that support various functionalities of the ground vehicle hub 118, such as software that are executed by the processors 308 to support the establishment of wired and wireless communication links. The memory 312 may also provide a data store 322. The data store 322 may store the sensor data collected by the body-worn devices 106(1)-106(N) or the protective vest 108. In some embodiments, an operating system may also be implemented via the one or more processors 308 and the memory 312 to perform various functions, as well as provide an execution environment that supports the executions of applications and modules.

The routing module 318 may handle the routing of sensor data that are received from the protective vest 108 and/or the body-worn devices to different recipient devices and services. In various embodiments, the routing module 318 may route sensor data from one or more body-worn devices to the event handler module 320, to another hub, and/or to the NOC servers 116 of the NOC 114. The routing module 318 may handle the routing of sensor data of each event based on customizable configuration settings stored in a configuration file.

In some embodiments, the routing module 318 may analyze a data set of the sensor data collected by sensors on the protective vest 108 and/or the body-worn devices of a law enforcement officer to determine whether an emergency situation occurred for the law enforcement officer. The data set may be received from a particular body-worn hub that is identified by a hub identifier. The data set may correspond to a recurring time interval, such as every two seconds, 5 seconds, ten seconds, etc. In some instances, the routing module 318 may perform such analysis when there is no route of wireless communication available to transmit the sensor data from the ground vehicle hub 118 to the NOC servers 116. For example, the routing module 318 may determine that no route of wireless communication with the NOC servers 116 is available when a ping or some other communication message to a network address of the NOC servers 116 resulted in no response from the NOC servers 116 within a predetermined time period. Otherwise, the routing module 318 may route the data set of sensor data to the NOC servers 116 via the route of wireless communication.

In other instances, the routing module 318 may analyze the data set of sensor data received from the particular body-worn hub when there is no route of wireless communication available to transmit the sensor data from the ground vehicle hub 118 to the NOC servers 116, and there is an absence of an action event notification from the body-worn hub that corresponds to the data set of sensor data. In other instances, the routing module 318 may analyze a data set of sensor data received from the particular body-worn hub as a default course of action. Otherwise, the routing module 318 may route the data set of sensor data to the NOC servers 116 via the route of wireless communication.

In at least one embodiment, the routing module 318 may determine that an emergency situation has occurred when certain sensor data from various combinations of one or more sensors are received. For example, the routing module 318 may determine that an emergency situation have occurred when the sensor data indicates: (1) penetration of the protective vest; (2) penetration of the protective vest in a specific area of the protective vest; (3) penetration of the protective vest and the officer is in a prone position; (4) a non-penetrating impact on the protective vest exceeding a certain impact force level threshold; (5) a non-penetrating impact on the protective vest exceeding a certain impact force level threshold in a specific area of the protective vest; (6) a non-penetrating impact on the protective vest and a first biometric reading (e.g., the blood pressure) or a second biometric reading (e.g., the heart rate) of the officer has deviated from a baseline level by a predetermined amount or percentage (e.g., 20% higher or lower); (7) each of the first biometric reading (e.g., the blood pressure) and/or the second biometric reading (e.g., the heart rate) of the officer deviating from a corresponding baseline level by more than a predetermined corresponding amount or percentage; or (8) a non-penetrating impact and gunshot sound detected.

Thus, if the routing module 318 determined that no emergency situation occurred, the routing module 318 may buffer the sensor data for transmission to the NOC servers 116 when a route of wireless communication to the NOC servers 116 becomes available. However, if the routing module 318 determined that an emergency situation occurred for the law enforcement officer, the routing module 318 may direct the event handler module 320 to perform one or more tasks to assist the law enforcement officer.

The event handler module 320 may use an event handler to process the sensor data received from one or more body-worn devices to generate commands for at least one specific body-worn device to perform a particular action. In various embodiments, the sensor data may be notifications received from body-worn devices that are directly connected to the body-worn hub 104 and/or notifications received from body-worn devices connected to other hubs. For example, the event handler module 320 may generate a command for the body camera 106(1) to start recording when the event handler module 320 receives a notification that the gun 112 is unholstered. In another example, the event handler module 320 may generate a command for the body camera 106(1) to start recording when event handler module 320 receives a notification that the gun 112 is unholstered and the biometric monitor 106(2) detects that the heart rate of the law enforcement officer 102 is above a predetermined rate threshold.

In other embodiments, the event handler module 320 may generate at least one particular command in response to one or more specific events based on a customizable handler configuration file. The customizable handler configuration file may specify one or more actions to be taken and the body-worn devices that are to take the actions for different sets of one or more sensor data. In other embodiments, the event handler module 320 may use a machine-learning algorithm to determine one or more actions to be taken and the body-worn devices that are to take the action based on different sets of one or more sensor data. The event handler module 320 may receive updates or modifications to the handler configuration profile from the NOC servers 116 of the NOC 114 for storage in the data store 322.

In additional embodiments, the event handler module 320 may be directed by the routing module 318 to perform one or more tasks to assist the law enforcement officer when an emergency situation is determined to have occurred. The tasks may include deploying a UAV from a corresponding ground vehicle to a geolocation of the law enforcement officer. Once the UAV arrives within a predetermined vicinity of the geolocation, the UAV may be configured to perform tasks such as record audiovisual footage of the scene around the geolocation, broadcast a warning noise or tone, illuminate the scene with onboard lighting, drop off a medical aid kit carried onboard to the law enforcement officer, activate a low-power and/or a high power transceiver to relay communication and sensor data between the body-worn hub 104 and a vehicle hub, another body-worn hub of another law enforcement officer, or the NOC servers 116, and/or so forth.

The tasks may further include processing the data set of sensor data to determine whether the officer is injured. In such embodiments, the event handler module 320 may use a trained ML model to process the received sensor data to predict that an officer may be injured, as well as determine the root cause of the injury, such as a gunshot, knife attack, blunt force attack with a weapon, blunt force attack without a weapon, officer knocked down, officer fell from a height, officer suffered a medical emergency, and/or so forth. The ML model may provide a confidence rating as to the probability that the injury occurred. If the confidence rating exceeds a threshold, the event handler module 320 may determine that the injury occurred. Accordingly, if the injury to the law enforcement officer occurred, the event handler module 320 may initiate one or more first actions to assist the law enforcement officer. For example, the actions may include triggering the body camera 106 of the law enforcement officer 102 to start a video recording, sending automatic requests for emergency situation assistance to nearby body-worn hubs or ground vehicle hubs of other law enforcement officers that are within communication range of the body-worn hub 104, in which the request includes details regarding the injury and the root cause of the injury. On the other hand, if the injury to the law enforcement officer did not occur, the event handler module 320 may initiate one or more second actions to assist the law enforcement officer. For example, the actions may include triggering the body camera 106 of the law enforcement officer 102 to start a video recording, sending automatic requests for emergency situation assistance to nearby body-worn hubs or ground vehicles of other law enforcement officers that are within communication range of the body-worn hub 104, in which the request indicates that the officer is not injured. Following the initiation of one or more actions, the event handler module 320 may send an action event notification to the NOC servers 116 to indicate that one or more actions have been taken by the ground vehicle hub 118. The action event notification may include details on the actions taken, data identifiers of the sensor data on which the action is based on, and/or so forth. The data identifiers may include a unique data set identifier, a time and date range of the sensor data for which the actions are taken, a hash of the sensor data belong to the time and date range, and/or so forth.

Example NOC Application

Figure 4:
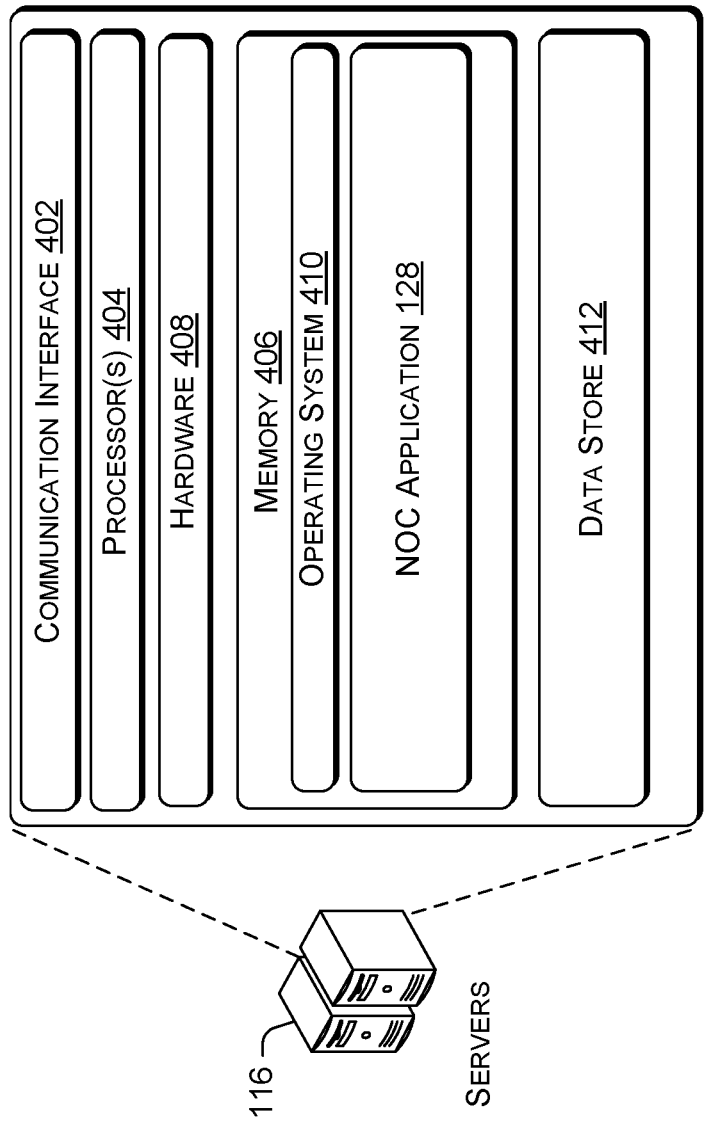
FIG. 4 is a block diagram showing various components of a network operation center (NOC) application on a NOC server that participates in emergency situation detection and response based on protective equipment sensor data.

FIG. 4 is a block diagram showing various components of a NOC application on a NOC server that participates in emergency situation detection and response based on protective equipment sensor data. The computing nodes 106 may provide a communication interface 402, one or more processors 404, memory 406, and hardware 408. The communication interface 402 may include wireless and/or wired communication components that enable the devices to transmit data to and receive data from other networked devices. The hardware 408 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 406 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 404 and the memory 406 of the computing nodes 106 may implement an operating system 410. In turn, the operating system 410 may provide an execution environment for the NOC application 130. The operating system 410 may include components that enable the computing nodes 106 to receive and transmit data via various interfaces (e.g., user controls, communication interface, and/or memory input/output devices), as well as process data using the processors 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system.

The NOC application 130 may include routines, program instructions, objects, and/or data structures that perform particular tasks or implement particular abstract data types. The memory 406 may also include a data store 420 that is used by the NOC application 130.

The NOC application 130 on the NOC servers 116 may receive a data set of sensor data collected by sensors on the protective vest 108 and/or the body-worn devices of a law enforcement officer to determine whether an emergency situation occurred for the law enforcement officer. The data set may be received from a particular body-worn hub that is identified by a hub identifier. The data set may correspond to a recurring time interval, such as every two seconds, 5 seconds, ten seconds, etc. In some instances, the NOC application 130 may analyze the data set of sensor data when an absence of an action event notification that corresponds to the data set of sensor data received at the NOC application 130 within a predetermined period of time. However, if the NOC application does receive an action event notification for the data set, the NOC application 130 may perform no analysis on the data set. Instead, the NOC application 130 may store the information from the action event notification in the data store 420. In other instances, the NOC application 130 may analyze a data set of sensor data as a default course of action.

In at least one embodiment, the NOC application 130 may determine that an emergency situation has occurred when certain sensor data from various combinations of one or more sensors are received. Thus, if the NOC application 130 determined that no emergency situation occurred, the NOC application 130 may store the sensor data in a data store 412. However, if the NOC application 130 determined that an emergency situation occurred for the law enforcement officer, the NOC application 130 may analyze the data set of sensor data to determine whether the law enforcement officer is injured. For example, the NOC application 130 may use a trained ML model to process the received sensor data to predict that an officer may be injured, as well as to determine the root cause of the injury, such as a gunshot, knife attack, blunt force attack with a weapon, blunt force attack without a weapon, officer knocked down, officer fell from a height, officer suffered a medical emergency, and/or so forth. In some instances, the trained ML model may also be used by modules in a body-worn hub or a ground vehicle hub in the same manner to make similar determinations.

The ML model may be trained via a model training algorithm. The model training algorithm may implement a training data input phase, a feature engineering phase, and a model generation phase. In the training data input phase, the model training algorithm may receive training datasets. For example, the NOC application 130 may use training datasets that include a combination of sensor data that includes protective equipment sensor data, incident report data, police dispatch, injury reports, and/or so forth. During the feature engineering phase, the model training algorithm may pinpoint features in the training data. Accordingly, feature engineering may be used by the model training algorithm to figure out the significant properties and relationships of the input datasets that aid a machine learning model to distinguish between different classes of data. During the model generation phase, the model training algorithm may select an initial type of machine learning algorithm to train a machine learning model using the training data. Following the application of a selected machine learning algorithm to the training data, the model training algorithm may determine a training error measurement of the machine learning model. If the training error measurement exceeds a training error threshold, the model training algorithm may use a rule engine to select a different type of machine learning algorithm based on a magnitude of the training error measurement. The different types of machine learning algorithms may include a Bayesian algorithm, a decision tree algorithm, a support vector machine (SVM) algorithm, an ensemble of trees algorithm (e.g., random forests and gradient-boosted trees), an artificial neural network, and/or so forth. The training process is generally repeated until the training results fall below the training error threshold, and the trained machine learning model is generated.

Alternatively, the NOC application 130 may analyze the data set of sensor data in conjunction with additional data to determine whether the law enforcement officer is injured. The NOC application 130 may use the additional data in the analysis based on a configuration setting inputted by an administrator at the NOC 114. For example, the additional data may include incident reports of incidents that occurred within a predetermined time interval of a current time that the emergency situation occurred and in a predetermined area that includes a geolocation of the law enforcement officer, such as an armed suspect on the loose, a riot in progress, a traffic accident occurred, a wildfire is burning in the area, etc.

The ML model may provide a confidence rating as to the probability that the injury occurred. If the confidence rating exceeds a threshold, the NOC application 130 may determine that the injury occurred. Accordingly, if the injury to the law enforcement officer occurred, the NOC application 130 may initiate one or more first actions to assist the law enforcement officer. For example, the actions may include triggering the body camera of the law enforcement officer to start a video recording, send automatic requests for emergency situation assistance to nearby body-worn hubs or ground vehicles of other law enforcement officers that are within a predetermined distance of the geolocation of the law enforcement officer, in which the request includes details regarding the injury and the root cause of the injury. On the other hand, if the injury to the law enforcement officer did not occur, the NOC application 130 may initiate one or more second actions to assist the law enforcement officer. For example, the actions may include triggering the body camera of the law enforcement officer to start a video recording, send automatic requests for emergency situation assistance to nearby body-worn hubs or ground vehicles of other law enforcement officers that are within a predetermined distance of the geolocation of the law enforcement officer, in which the request indicates that the officer is not injured. Following the initiation of one or more actions, the NOC application 130 may record information on the initiation of the one or more actions in the data store 412.

Example Processes

FIGS. 5-8 present illustrative processes 500-800 for implementing emergency situation detection and response based on protective equipment sensor data. Each of the processes 500-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 500-800 are described with reference to the environment 100 of FIG. 1.

Figure 5:
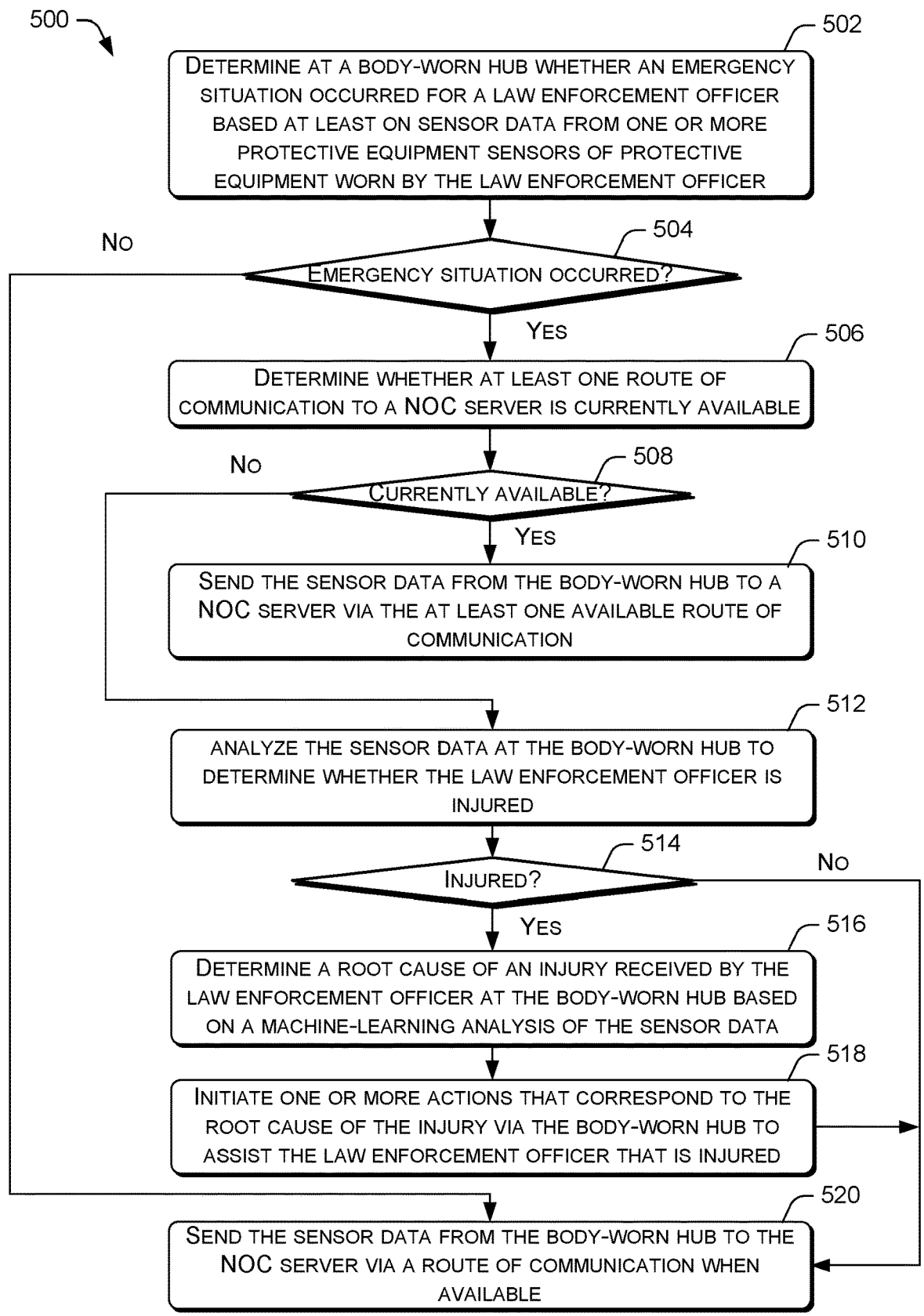
FIG. 5 is a flow diagram of an example process that is used by a body-worn hub to coordinate with a NOC server for emergency situation detection and response based on protective equipment sensor data.

FIG. 5 is a flow diagram of an example process 500 that is used by a body-worn hub to coordinate with a NOC server for emergency situation detection and response based on protective equipment sensor data. At block 502, a body-worn hub may determine whether an emergency situation occurred for a law enforcement officer based at least on sensor data received from one or more protective equipment sensors of protective equipment worn by the law enforcement officer. In some embodiments, the body-worn hub may make the determination based on sensor data received from one or more other body-worn devices of the law enforcement officer. At decision block 504, if the body-worn hub determines that the emergency situation occurred ("yes" at decision block 504), the process 500 may proceed to block 506. At block 506, the body-worn hub may determine whether at least one route of communication to a NOC server is currently available. At decision block 508, if the body-worn hub determines that at least one route of communication to the NOC server is available ("yes" at decision block 508), the process 500 may proceed to block 510.

At block 510, the body-worn hub may send the sensor data to a NOC server via the at least one available route of communication. However, if the body-worn hub determines that no route of communication to the NOC server is available ("no" at decision block 508), the process 500 may proceed to block 512. At block 512, the body-worn hub may analyze the sensor data to determine whether the law enforcement officer is injured.

At decision block 514, if the body-worn hub determines that the law enforcement officer is injured ("yes" at decision block 514), the process 500 may proceed to block 516. At block 516, the body-worn hub may determine a root cause of an injury received by the law enforcement officer based on a machine-learning analysis of the sensor data. At block 518, the body-worn hub may initiate one or more actions that correspond to the root cause of the injury to assist the law enforcement officer that is injured. Subsequently, the body-worn hub may send the sensor data from the body-worn hub to the NOC server via a route of communication when the route of communication becomes available. Returning to decision block 504, if the body-worn hub determines that no emergency situation occurred ("no" at decision block 504), the process 500 may proceed directly to block 520.

Figure 6:
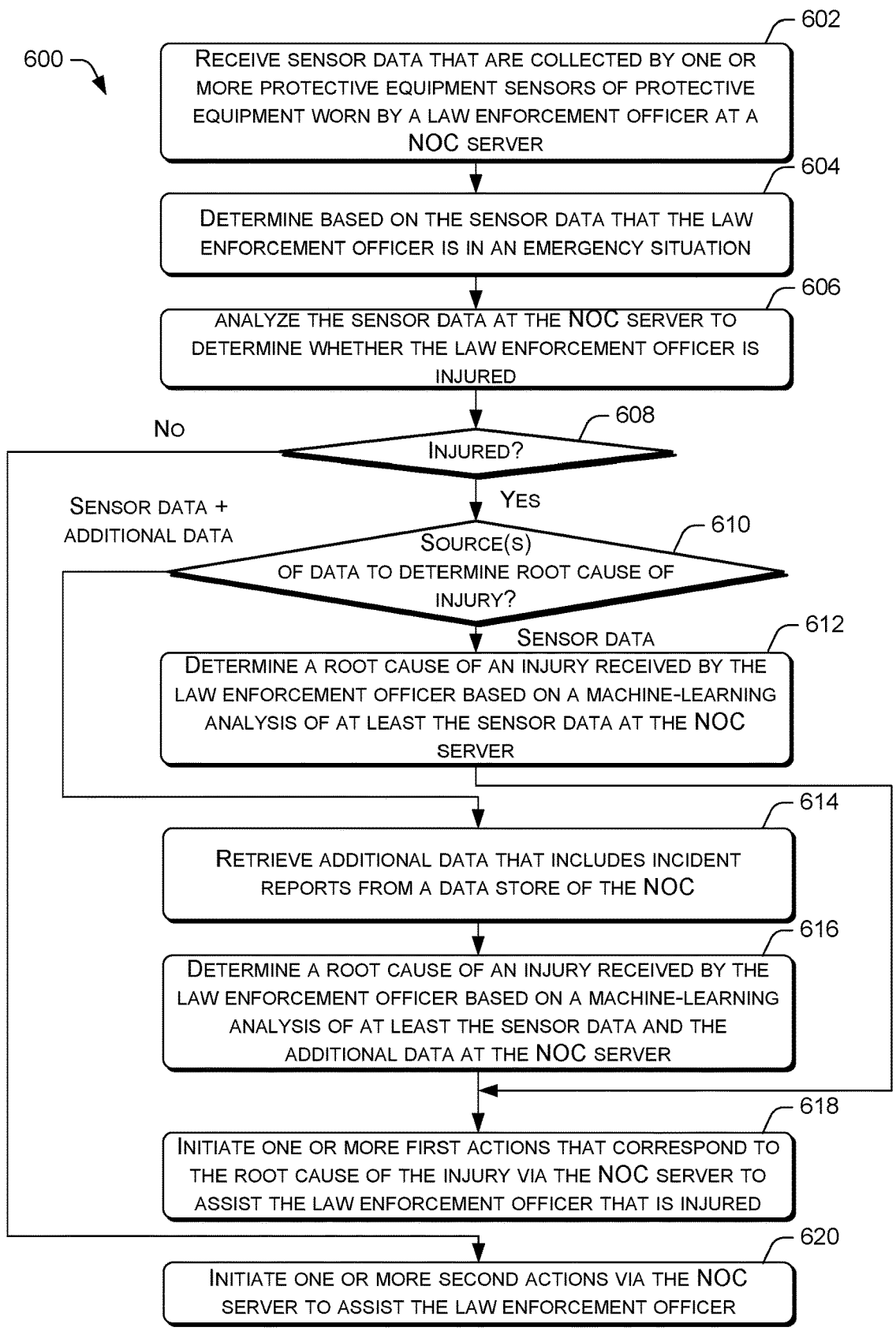
FIG. 6 is a flow diagram of an example process that is used by a NOC application on a NOC server to perform emergency situation detection and response based at least on protective equipment sensor data.

FIG. 6 is a flow diagram of an example process 600 that is used by a NOC application on a NOC server to perform emergency situation detection and response based at least on protective equipment sensor data. At block 602, the NOC server may receive sensor data that are collected by one or more protective equipment sensors of protective equipment worn by a law enforcement officer. At block 604, the NOC server may determine based on the sensor data that the law enforcement officer is in an emergency situation. At block 606, the NOC server may analyze the sensor data to determine whether the law enforcement officer is injured. At decision block 608, if the NOC server determines that the law enforcement officer is injured ("yes" at decision block 608) the process 600 may proceed to decision block 610. At decision block 610, the NOC server may use either at least the protective equipment sensor data or a combination of at least the protective equipment sensor data and additional data to determine a root cause of the injury. For example, the additional data may include incident reports of incidents that occurred within a predetermined time interval of a current time that the emergency situation occurred and in a predetermined area that includes a geolocation of the law enforcement officer. The particular data used by the NOC server for the determination may be dependent on a configuration setting. Thus, if the NOC server uses at least the protective equipment sensor data without using the additional data, the process 600 may proceed to block 612. At block 612, the NOC server may determine a root cause of injury received by the law enforcement officer based on a machine-learning analysis of at least the protective equipment sensor data.

However, if the NOC server uses at least the protective equipment sensor data and the additional data, the process 600 may proceed to block 614. At block 614, the NOC server may retrieve additional data that includes incident reports from a data store of the NOC. At block 616, the NOC server may determine a root cause of an injury received by the law enforcement officer based at least on a machine-learning of the sensor data and the additional data. At block 618, the NOC server may initiate one or more first actions that correspond to the root cause of the injury to assist the law enforcement officer that is injured. Returning to the decision block 608, if the NOC server determines that the law enforcement officer is not injured ("no" at decision block 608), the process 600 may proceed to block 620. At block 620, the NOC server may initiate one or more second actions to assist the law enforcement officer.

Figure 7:
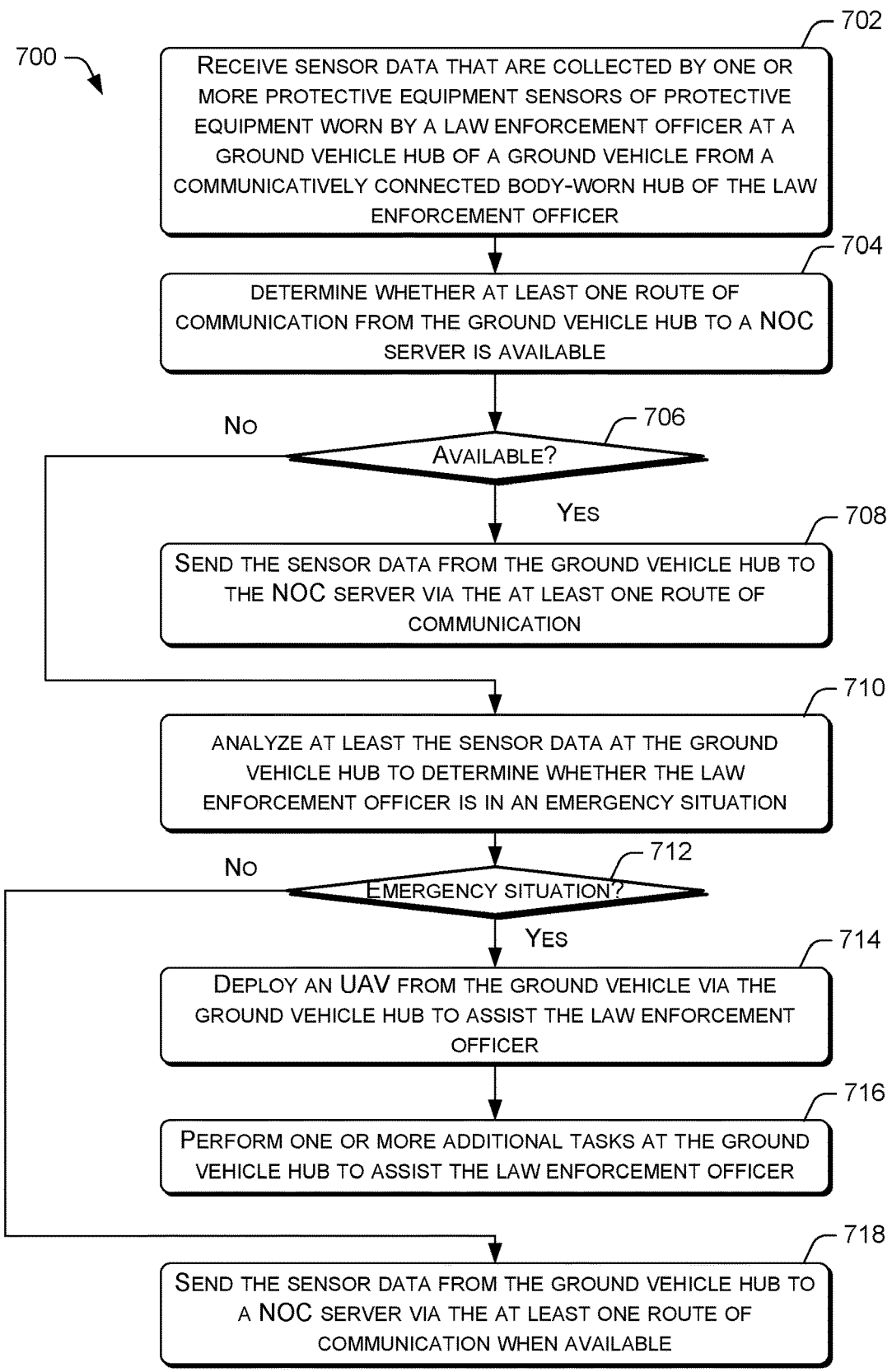
FIG. 7 is a flow diagram of an example process that is used by a ground vehicle hub to coordinate with a NOC server for emergency situation detection and response based on protective equipment sensor data.

FIG. 7 is a flow diagram of an example process 700 that is used by a ground vehicle hub to coordinate with a NOC server for emergency situation detection and response based on protective equipment sensor data. At block 702, a ground vehicle hub of a ground vehicle may receive sensor data that are collected by one or more protective equipment sensors of protective equipment worn by a law enforcement officer from a communicatively connected body-worn hub of the law enforcement officer.

At block 704, the ground vehicle hub may determine whether at least one route of communication from the ground vehicle hub to a NOC server is available. At decision block 706, if the ground vehicle hub determines that at least one route of communication is available ("yes" at decision block 706), the process 700 may proceed to block 708. At block 708, the ground vehicle hub may send the sensor data from the ground vehicle hub to the NOC server via the at least one route of communication. However, if the ground vehicle hub determines that no route of communication is available ("no" at decision block 706), the process 700 may proceed to block 710. At block 710, the ground vehicle hub may analyze at least the sensor data to determine whether the law enforcement officer is in an emergency situation. In some embodiments, the ground vehicle hub may make the determination based on sensor data received from one or more other body-worn devices of the law enforcement officer. At decision block 712, if the ground vehicle hub determines that the law enforcement officer is in an emergency situation ("yes" at decision block 712), the process 700 may proceed to block 714. At block 714, the ground vehicle hub may deploy a UAV from the ground vehicle to assist the law enforcement officer. At block 716, the ground vehicle hub may perform one or more additional tasks to assist the law enforcement officer. Returning to decision block 712, if the ground vehicle hub determines that the law enforcement officer is not in an emergency situation ("no" at decision block 712), the process 700 may proceed to block 718. At block 718, the ground vehicle hub may send the sensor data from the ground vehicle hub to a NOC server via at least one route of communication when the at least one route of communication becomes available.

Figure 8:
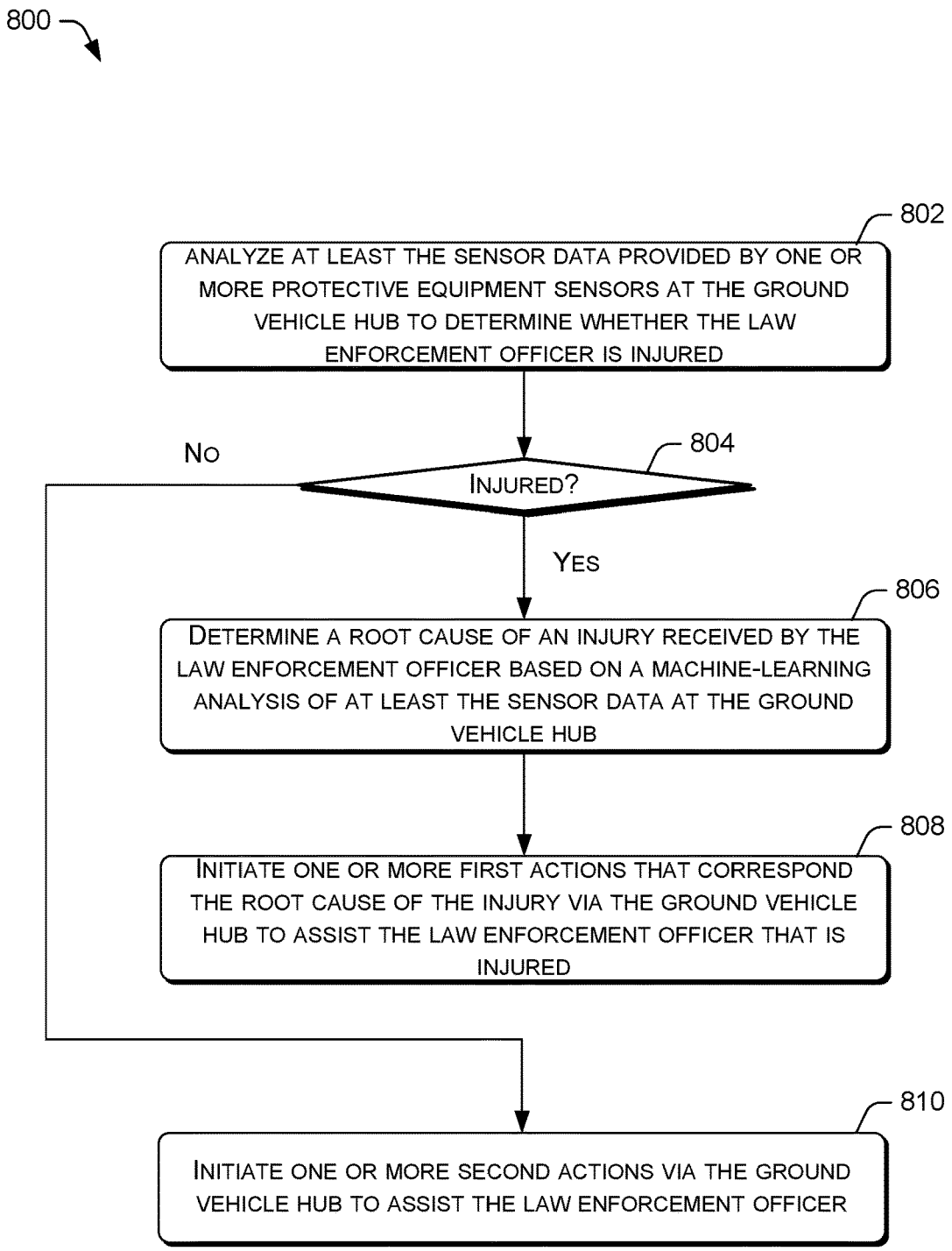
FIG. 8 is a flow diagram of an example process that is used by a ground vehicle hub to initiate one or more actions to assist a law enforcement officer based on protective equipment sensor data.

FIG. 8 is a flow diagram of an example process 800 that is used by a ground vehicle hub to initiate one or more actions to assist a law enforcement officer based on protective equipment sensor data. The example process 800 may further describe block 716 of the process 700. At block 802, the ground vehicle hub may analyze at least the sensor data provided by one or more protective equipment sensors to determine whether the law enforcement is injured. At decision block 804, if the ground vehicle hub determines that the law enforcement officer is injured ("yes" at decision block 804), the process 800 may proceed to block 806. At block 806, the ground vehicle hub may determine a root cause of an injury received by the law enforcement officer based on a machine-learning analysis of at least the sensor data. At block 808, the ground vehicle hub may initiate one or more first actions that correspond to the root cause of the injury to assist the law enforcement officer that is injured.

Returning to decision block 804, if the ground vehicle hub determines that the law enforcement officer is not injured ("no" at decision block 804), the process 800 may proceed to block 810. At block 810, the ground vehicle hub may initiate one or more second actions to assist the law enforcement officer.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a body-worn hub storing computer-executable instructions that upon execution cause one or more processors to perform acts comprising:

receiving sensor data from one or more protective equipment sensors of protective equipment worn by a person;

determining whether an emergency situation occurred for the person based at least on the sensor data;

sending a communication message to a server;

receiving no response to the communication message;

determining that a two-way route of communication between the body-worn hub and the server is unavailable based on receiving no response to the communication message; and in response to determining based at least on the sensor data that an emergency situation occurred for the person and determining that a two-way route of communication from the body-worn hub to the server is unavailable, analyzing the sensor data at the body-worn hub to determine whether the person is injured.

2. The one or more non-transitory computer-readable media of claim 1, wherein the acts further comprise in response to determining that the person is injured, initiating one or more actions that correspond to a root cause of an injury via the body-worn hub to assist the person.

3. The one or more non-transitory computer-readable media of claim 2, wherein the one or more actions include at least one of starting a video recording by a body-worn device of the person or sending a request for emergency situation assistance to a body-worn hub or a ground vehicle hub of an additional person that is within a communication range of the body-worn hub, in which the request includes details regarding the injury and the root cause of the injury.

4. The one or more non-transitory computer-readable media of claim 1, wherein the acts further comprising, in response to determining that the person is uninjured, initiating one or more actions that include at least one of starting a video recording by a body-worn device of the person or sending a request for emergency situation assistance to a body-worn hub or a ground vehicle hub of an additional person that is within a communication range of the body-worn hub.

5. The one or more non-transitory computer-readable media of claim 1, wherein the person is a law enforcement officer.

6. The one or more non-transitory computer-readable media of claim 1, wherein the server is a network operation center (NOC) server that is associated with a police station or an emergency assistance dispatch center.

7. The one or more non-transitory computer-readable media of claim 1, wherein the protective equipment includes a protective vest, and wherein the protective equipment sensors include at least one of a wire mesh-based impact sensor, a gel-based impact sensor, a biometric sensor, a gait sensor, an orientation sensor, a moisture sensor, or an audio sensor.

8. The one or more non-transitory computer-readable media of claim 1, wherein the determining whether the person is injured is based on the sensor data and output of a machine-learning model trained on training datasets that include a combination of sensor data that provides a confidence rating as to a probability that the injury occurred.

9. The one or more non-transitory computer-readable media of claim 1, wherein sending the sensor data from the body-worn hub to the server via the at least one route of communication includes sending the sensor data from the body-worn hub to a ground vehicle hub via a low-power transceiver of the body-worn hub for the ground vehicle hub to transmit the sensor data to the server while sending the sensor data via a high-power transceiver of the body-worn hub to the server.

10. A server, comprising:
one or more processors; and
memory including a plurality of computer-executable components that are executable by the one or more processors to perform a plurality of actions, the plurality of actions comprising:
receiving sensor data that are collected by one or more protective equipment sensors of protective equipment worn by a person;
determining, based at least on the sensor data, that the person is in an emergency situation;
in response to the determining that the person is in an emergency situation, analyzing the sensor data that are collected by the one or more protective equipment sensors to determine whether the person is injured, wherein the determining whether the person is injured is based on the sensor data and output of a machine-learning model trained on training datasets that include a combination of sensor data that provides a confidence rating as to a probability that the injury occurred;
in response to determining that the person is injured, determining a root cause of an injury based at least on an analysis of one or more of the sensor data or additional data stored by the server, and initiating one or more first actions that correspond to the root cause of the injury to assist the person; and
in response to determining that the person is uninjured, initiating one or more second actions to assist the person.

11. The server of claim 10, wherein the one or more first actions include at least one of starting a video recording by a body-worn device of the person or sending a request for emergency situation assistance to a body-worn hub or a ground vehicle hub that is within a predetermined distance of a geolocation of the person, in which the request includes details regarding the injury and the root cause of the injury.

12. The server of claim 10, wherein the one or more second actions that include at least one of starting a video recording by a body-worn device of the person or sending a request for emergency situation assistance to a body-worn hub or a ground vehicle hub that is within a predetermined distance of a geolocation of the person.

13. The server of claim 10, wherein the person is a law enforcement officer, and the protective equipment includes a protective vest, and wherein the protective equipment sensors include at least one of a wire mesh-based impact sensor, a gel-based impact sensor, a biometric sensor, a gait sensor, an orientation sensor, a moisture sensor, or an audio sensor.

14. The server of claim 10, wherein the server is a network operation center (NOC) server that is associated with a police station or an emergency assistance dispatch center, and wherein the additional data stored by the server includes incident reports of incidents that occurred within a predetermined time interval of a current time that the emergency situation occurred and in a predetermined area that includes a geolocation of the person.

15. A computer-implemented method, comprising:
receiving sensor data that are collected by one or more protective equipment sensors of protective equipment worn by a person at a ground vehicle hub of a ground vehicle, the sensor data being provided to the ground vehicle hub by a body-worn hub of the person that is communicatively connected to the one or more protective equipment sensors and the ground vehicle hub of the ground vehicle;
sending a communication message to a server;
receiving no response to the communication message;
determining that a two-way route of communication between the body-worn hub and the server is unavailable based on receiving no response to the communication message; and
in response to determining that there is no available two-way route of communication from the ground vehicle hub to the server, analyzing at least the sensor data at the ground vehicle hub of the ground vehicle to determine whether the person is in an emergency situation.

16. The computer-implemented method of claim 15, further comprising in response to determining that the person is in an emergency situation, initiating at least one of deploying an unmanned aerial vehicle (UAV) from the ground vehicle via the ground vehicle hub to assist the person or performing one or more additional tasks at the ground vehicle hub to assist the person.

17. The computer-implemented method of claim 16, wherein the performing the one or more additional tasks include:
analyzing at least the sensor data provided by the one or more protective equipment sensors at the ground vehicle hub to determine whether the person is injured;
in response to determining that the person is injured, determining a root cause of an injury received by the person based on an analysis of at least the sensor data at the ground vehicle hub, and initiating one or more first actions that correspond to the root cause of an injury via the ground vehicle hub to assist the person; and
in response to determining that the person is uninjured, initiating one or more second actions to assist the person.

18. The computer-implemented method of claim 15, wherein the person is a law enforcement officer, and the protective equipment includes a protective vest, and wherein the protective equipment sensors include at least one of a wire mesh-based impact sensor, a gel-based impact sensor, a biometric sensor, a gait sensor, an orientation sensor, a moisture sensor, or an audio sensor.

* * * * *